(12) United States Patent
Blasco et al.

(10) Patent No.: US 9,952,863 B1
(45) Date of Patent: Apr. 24, 2018

(54) PROGRAM COUNTER CAPTURING (71) Applicant: Apple Inc., Cupertino, CA (US)

(72) Inventors: Conrado Blasco, Sunnyvale, CA (US); Deepankar Duggal, Sunnyvale, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 14/842,421

(22) Filed: Sep. 1, 2015

(51) Int. Cl.
*G06F 9/44* (2006.01)
*G06F 9/45* (2006.01)
*G06F 9/445* (2006.01)
*G06F 9/30* (2018.01)
*G06F 9/38* (2018.01)
*G06F 9/32* (2018.01)

(52) U.S. Cl.
CPC ........ *G06F 9/3005* (2013.01); *G06F 9/30145* (2013.01); *G06F 9/3855* (2013.01); *G06F 9/30079* (2013.01); *G06F 9/327* (2013.01)

(58) Field of Classification Search
CPC .. G06F 9/3005; G06F 9/30145; G06F 9/3855; G06F 9/30079; G06F 9/327
See application file for complete search history.

(56) References Cited

U.S. PATENT DOCUMENTS

| 6,622,269 B1 * | 9/2003 | Ngo | G11C 29/14 714/718 |
| 7,502,727 B2 * | 3/2009 | Agarwala | G06F 11/3636 703/23 |
| 7,685,467 B2 * | 3/2010 | Mandal | G06F 11/3648 714/29 |
| 7,779,238 B2 * | 8/2010 | Kosche | G06F 11/3447 712/227 |

(Continued)

OTHER PUBLICATIONS

Joseph L. Greathouse, Demand-Driven Software Race Detection using Hardware Performance Counters, Jun. 4-8, 2011, San Jose, California, USA, pp. 165-176.*

(Continued)

*Primary Examiner* — Thuy Dao
*Assistant Examiner* — Mongbao Nguyen
(74) *Attorney, Agent, or Firm* — Meyertons, Hood, Kivlin, Kowert & Goetzel, P.C.

(57) ABSTRACT

Techniques are disclosed relating to capturing information related to instructions executing on in a processor. In one embodiment, an integrated circuit is disclosed that includes an execution pipeline configured to execute a sequence of instructions. The integrated circuit includes monitoring circuitry configured to monitor the execution pipeline for occurrences of an event associated with the sequence of instructions, and in response to detecting a particular number of occurrences of the event, capture a value of a program counter corresponding to an instruction of the sequence of (Continued)

instructions that is associated with an occurrence of the event. The monitoring circuitry stores the captured value of the program counter in a distinct capture register and signals an interrupt indicating that the captured value of the program counter is retrievable from the capture register. In some embodiments, a debugging application may retrieve the value and present it to a developer attempting perform code profiling.

16 Claims, 5 Drawing Sheets

(56) References Cited

U.S. PATENT DOCUMENTS

| | | | | |
|---|---|---|---|---|
| 8,296,607 | B2* | 10/2012 | Mandal | G06F 11/3648 |
| | | | | 714/45 |
| 8,418,099 | B2 | 4/2013 | Karlsson | |
| 8,495,734 | B2 | 7/2013 | Bancel et al. | |
| 8,918,664 | B2 | 12/2014 | Sugiyama et al. | |
| 9,135,015 | B1* | 9/2015 | Mizrahi | G06F 9/3861 |
| 2006/0224873 | A1* | 10/2006 | McCormick, Jr. | G06F 9/3861 |
| | | | | 712/244 |
| 2006/0259831 | A1* | 11/2006 | Sohm | G06F 11/3471 |
| | | | | 714/45 |
| 2007/0168972 | A1* | 7/2007 | Bates | G06F 11/3664 |
| | | | | 717/124 |
| 2007/0168994 | A1* | 7/2007 | Barsness | G06F 11/362 |
| | | | | 717/129 |
| 2007/0234294 | A1* | 10/2007 | Gooding | G06F 11/3664 |
| | | | | 717/124 |
| 2007/0294585 | A1* | 12/2007 | Mandal | G06F 11/3648 |
| | | | | 714/38.13 |
| 2008/0127120 | A1* | 5/2008 | Kosche | G06F 11/3447 |
| | | | | 717/131 |
| 2010/0011250 | A1 | 1/2010 | Pedersen | |
| 2012/0226839 | A1* | 9/2012 | Fuoco | G06F 11/3636 |
| | | | | 710/110 |
| 2012/0297173 | A1* | 11/2012 | Tudor | G06F 11/3636 |
| | | | | 712/227 |
| 2013/0042155 | A1* | 2/2013 | Millet | G06F 11/3636 |
| | | | | 714/45 |
| 2013/0263094 | A1* | 10/2013 | Bates | G06F 11/3636 |
| | | | | 717/129 |
| 2014/0013020 | A1* | 1/2014 | Horsnell | G06F 13/24 |
| | | | | 710/260 |
| 2014/0157039 | A1* | 6/2014 | Peck | G06F 11/07 |
| | | | | 714/2 |
| 2014/0173261 | A1* | 6/2014 | Garza | G06F 11/2236 |
| | | | | 712/234 |
| 2015/0058605 | A1* | 2/2015 | Madampath | G06F 9/30058 |
| | | | | 712/234 |
| 2015/0347267 | A1* | 12/2015 | Combs | G06F 11/3466 |
| | | | | 714/47.2 |
| 2015/0355996 | A1* | 12/2015 | Smith | G06F 11/3636 |
| | | | | 717/128 |
| 2017/0235579 | A1* | 8/2017 | Knauth | G06F 9/3861 |
| | | | | 712/206 |

OTHER PUBLICATIONS

Satish Narayanasamy, BugNet: Continuously Recording Program Execution for Deterministic Replay Debugging, 2005, pp. 1-12.*
Vladimir Uzelac, Real-time Unobstrusive Program Execution Trace Compression Using Branch Predictor Events, 2010, pp. 1-10.*
Vialdimir Uzelac, Using Branch Predictors and Variable Encoding for On-the-Fly Program Tracing, 2011, 2014, pp. 1-13.*
Vladimir UZelac, Real-time Unobstrusive Program Execution Trace Compression Using Branch Predictor Events, pp. 1-10. http://delivery.acm.org/10.1145/1880000/1878938/p97-uzelac.pdf? (Year: 2010).*

* cited by examiner

PROGRAM COUNTER CAPTURING

BACKGROUND

Technical Field

This disclosure relates generally to processors, and, more specifically, to capturing information about instructions executing on a processor.

Description of the Related Art

Modern processors typically include multiple pipeline stages that facilitate execution of program instructions. Execution may begin at an initial stage in which an instruction fetch unit retrieves instructions from memory. In order to correctly identify which instructions should be retrieved, a processor may include a register that maintains a value identifying which instruction to retrieve and execute. Such a register is commonly referred to as a program counter or PC. In many instances, the PC value is the address of the instruction in memory. As an instruction fetch unit retrieves instructions from memory, the instruction fetch unit may increment the PC value by an instruction width (e.g., incremented for 64 bits for a 64-bit architecture). This PC value may also be altered when control transfer instructions are executed such as branch instructions, call instructions, return instructions, jump instructions, etc.

Knowing the value of the program counter can be particularly beneficial when performing code profiling in an effort to optimize execution or debug a program. For example, if a program has poor performance because it suffers from a higher number of cache misses, knowing a program counter value associated with the cache misses may be useful to help identify which instructions are causing the cache misses. Once a software developer has identified these instructions, the developer may be able to identify a potential problem with program flow and modify instructions in the program to better improve cache utilization.

SUMMARY

The present disclosure describes embodiments in which a processor may include circuitry that is configured to collect various forms of information about instructions executing in an execution pipeline. In one embodiment, this circuitry may use this information to detect occurrences of various events associated with executing instructions such as cache misses, branch mispredictions, translation lookaside buffer (TLB) misses, etc. In response to detecting a particular number of occurrences of an event, the circuitry, in one embodiment, captures a value of a program counter associated with the occurrences and stores the value in a register distinct from the program counter. The circuitry may then provide the value stored in the distinct register upon request and identify the event associated with the value. In some embodiments, this information may be used to facilitate improving software performance (e.g., code profiling) and/or identifying potential problems in software.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "execution pipeline configured to execute a sequence of instructions" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically indicated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure recognizes that capturing an accurate value of a program counter (PC) can be problematic. For example, a developer might attempt to use debugging software that attempts to halt a processor's execution when a particular event is detected (e.g., a particular number of cache misses occur). Unfortunately, when the debugging software detects the event and inserts a break point to halt the processor, the processor pipeline may still attempt to execute several instructions before coming to a stop. At this point, the PC value may been have incremented several times making it difficult to identify the instructions associated with the detected event.

As will be described below, a processor may be modified, in various embodiments, to include monitoring circuitry that is programmable to detect various events associated with an executing program. In response to detecting one of the various events, the monitoring circuitry may automatically capture a value of the PC and store the value into a register accessible to a developer. The term "automatically" refers to the monitoring circuitry's ability to capture the PC value without an explicit instruction to do so—e.g., from a user, debugging software, etc. In other words, the monitoring circuit is configured to capture the PC value associated with a set of specified occurrences without requiring a specified command to do so. Accordingly, a processor executing the ARM instruction "MOV RO, PC" would not be automatically capturing the PC value into the register RO as the processor is attempting to move the PC value in response to an explicit instruction to do so. Being able to capture the PC value automatically can allow a more precise PC to be captured for a detected event, which, in some instances, can help a developer more accurately diagnose potential issues in a piece of software.

Figure 1:
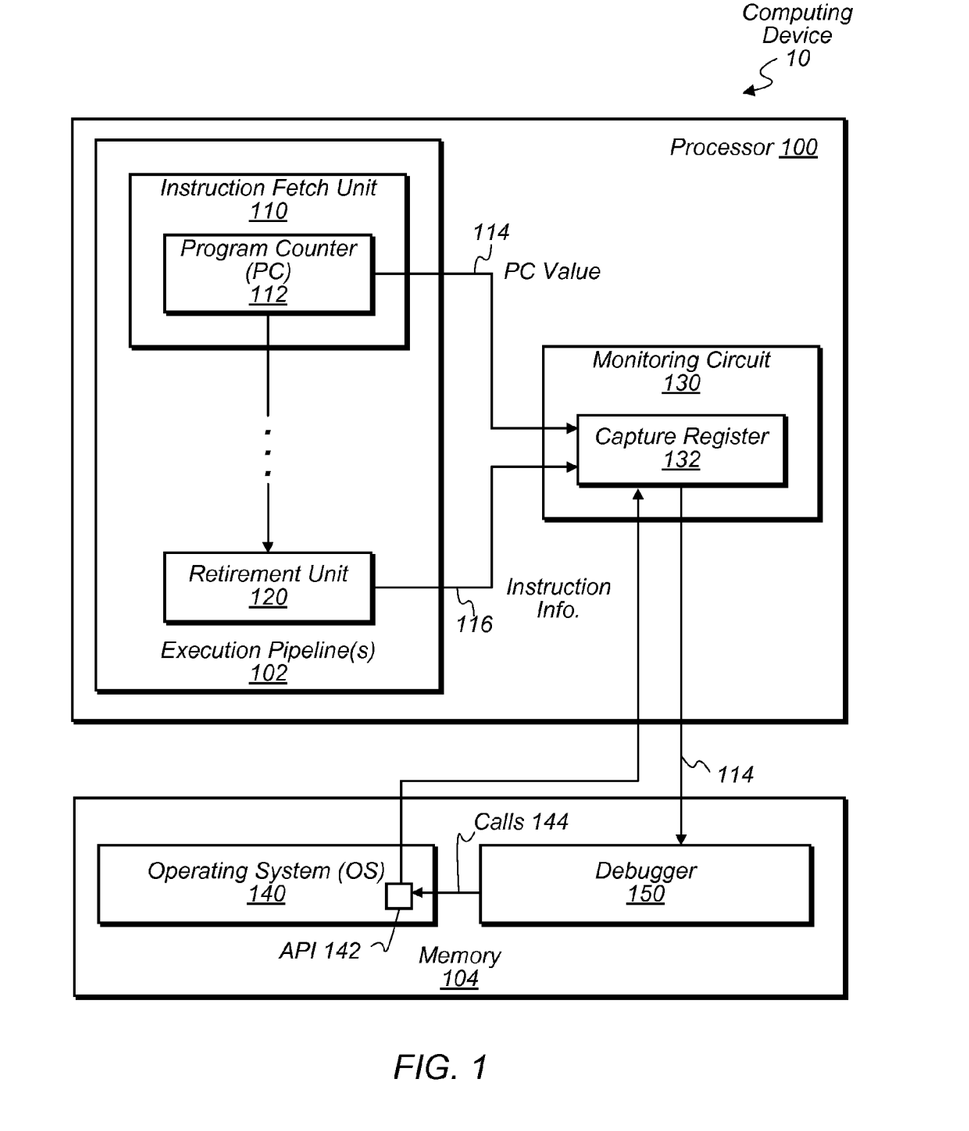
FIG. 1 is a block diagram illustrating one embodiment of a processor having circuitry configured to capture a program counter value.

Turning now to FIG. 1, a block diagram of a computing device 10 that includes circuitry configured to capture a program counter value is depicted. In the illustrated embodiment, computing device 10 includes a processor 100 that includes one or more execution pipelines 102 with an instruction fetch unit 110 and a retirement unit 120. Processor 100 also includes a program counter (PC) 112 within instruction fetch unit 110 that stores a PC value 114, and a monitoring circuit 130, which includes a capture register 132. Although PC 112 is shown as being within instruction fetch unit 110, PC 112 may be within other areas of processor 100 in some embodiments. Computing device 10 also includes a memory 104 storing an operating system 140 and a debugger 150. In various embodiments, computing device 10 may be implemented differently than shown. For example, in various embodiments, computing device 10 may include additional elements such as those discussed below with respect to FIG. 5.

Execution pipeline 102, in one embodiment, is circuitry configured to execute instructions within various pipeline stages such as fetch, decode, issuance, execute, retirement, etc. As used herein, the term "execution" is used to generally refer to the process of an instruction progressing through an execution pipeline and is not limited to referring to an execute stage within a pipeline such as a load/store unit, an arithmetic logic unit (ALU), etc. In some embodiments, pipeline 102 may support out-of-order execution (OoOE), speculative execution, and/or scouting, or any other technique to improve performance.

Instruction fetch unit (IFU) 110, in one embodiment, is circuitry configured to implement the fetch stage of pipeline 102. Accordingly, IFU 110 may read instructions from memory (such as one or more levels of instruction caches and memory 104) and insert the instructions into pipeline 102. In the illustrated embodiment, IFU 110 fetches instructions based on the PC value 114 stored in PC 112. In some embodiments, when IFU 110 inserts an instruction into pipeline 102, IFU 110 may also provide the current PC value (e.g., the address of the instruction) along with the inserted instruction. This PC value may then accompany the instruction as it progresses through pipeline 102.

Retirement unit 120, in one embodiment, is circuitry configured to implement a retirement stage (also referred to as a commit stage or write-back stage). Accordingly, retirement unit 120 may collect execution results and use them to update the architectural state of processor 100 (e.g., update architecturally-defined registers). In some embodiments, retirement unit 120 may also handle reordering instructions when OoOE is employed by pipeline 102. In one embodiment, retirement unit 120 may determine the correct ordering of instructions (i.e., program order) by using the respective PC values that accompany the instructions through pipeline 102. As will be with respect to FIG. 2, in some embodiments, retirement unit 120 may store the PC values and various instruction information, such as execution results and execution statistics, in a reorder buffer (not pictured) accessible to monitoring circuit 130.

Monitoring circuit 130, in one embodiment, is circuitry configured to collect various types of metadata about instructions executing in execution pipeline 102. In various embodiments, monitoring circuit 130 may capture PC values 114 associated with particular events. That is, monitoring circuit 130 may monitor occurrences of one or more events and store the PC values 114 into capture register 132 that correspond to instructions that caused the events. As will be described with respect to FIG. 3, in some embodiments, these events may include, for example, retirements of particular types of instructions (e.g., call instructions, load instructions, etc.), cache misses, branch mispredictions, etc. In the embodiment illustrated in FIG. 1, monitoring circuitry 130 identifies the occurrence of events based on instruction information 116 (described below with respect to FIG. 2) retrieved from retirement unit 120. In other embodiments, monitoring circuit 130 may collect instruction information 116 from additional stages in pipeline 102 (and may not collect information 116 from retirement unit 120 in some embodiments).

In some embodiments, rather than capture a PC value 114 for every detected occurrence of an event, monitoring circuit 130 may capture a PC value 114 in response to the number of occurrence of an event satisfying a threshold value. For example, monitoring circuit 130 may capture a PC value 114 for a mispredicted branch instruction after a hundred branch mispredictions have happened. In various embodiments, the particular events being monitored and/or threshold values may be programmable. For example, in one embodiment, monitoring circuit 130 may be instructed to capture PC value 114 after a hundred cache misses and to capture another PC value 114 after fifty branch mispredictions.

In some embodiments, when monitoring circuit 130 is capturing a PC value 114 in response to N occurrences of an event, the captured PC value 114 is the address of the instruction identified as causing the Nth occurrence of the event. In another embodiment, however, the captured PC value 114 may be the address of the instruction that causes the Nth+1 occurrence. That is, after N occurrences, detection of the Nth+1 occurrence causes a capture. In still other embodiments, the captured PC value 114 is the address of an instruction that causes an occurrence of an event within a range after N occurrences (e.g., the address of the instruction causing either the Nth+1, Nth+2, or Nth+3 occurrence). In some embodiments in which OoOE is implemented, whether the captured PC value 114 is for the Nth+1 occurrence, Nth+2 occurrence, etc. may be based on the ordering in which instructions arrive at retirement unit 120 and based on the number of permitted inflight instructions.

In various embodiments, monitoring circuit 130 may indicate that it has detected an occurrence of an event (or a particular number of occurrences) by sending an interrupt request (IRQ) to processor 100. In response to receiving the request, processor 100 may initiate execution of operating system 140 to handle servicing the interrupt, which may, in turn, notify an application using data from monitoring circuit 130—e.g., debugger 150 in the illustrated embodiment. In some embodiments, monitoring circuit 130 raises the interrupt (i.e., sends the IRQ) after it has captured the corresponding PC value associated with the interrupt. In such an embodiment, monitoring circuit 130 raising the interrupt permits retrieval of the captured PC 114.

Debugger 150, in one embodiment, is an application that is executable to assist a software developer diagnosing problems and/or optimizing software performance (e.g., through code profiling). In various embodiments, debugger 150 may present a user interface that allows a user to select which events are monitored and set threshold values for occurrences when a program is being tested. As instructions of the program execute, debugger 150 may indicate which of the selected events have occurred and the corresponding PC values 114 read from capture register 132. In some embodiments, debugger 150 may also identify which instructions were associated with the events based on PC values 114. In some embodiments, debugger 150 may configure monitoring circuit 130 and retrieve information from monitoring circuit 130 by accessing an application programming interface (API) 142 of operating system 140. For example, debugger 150 may issue API calls 144 to cause operating system 140 to write configuration information into monitoring circuit 130 and to read information from circuit 130. In another embodiment, registers in monitoring circuit 130, such as capture register 132, may be mapped to particular memory locations that are accessible to debugger 150. In some embodiment, applications other than a debugger may retrieve information from monitoring circuit 130 including PC values 114 stored in capture register 132.

Figure 2:
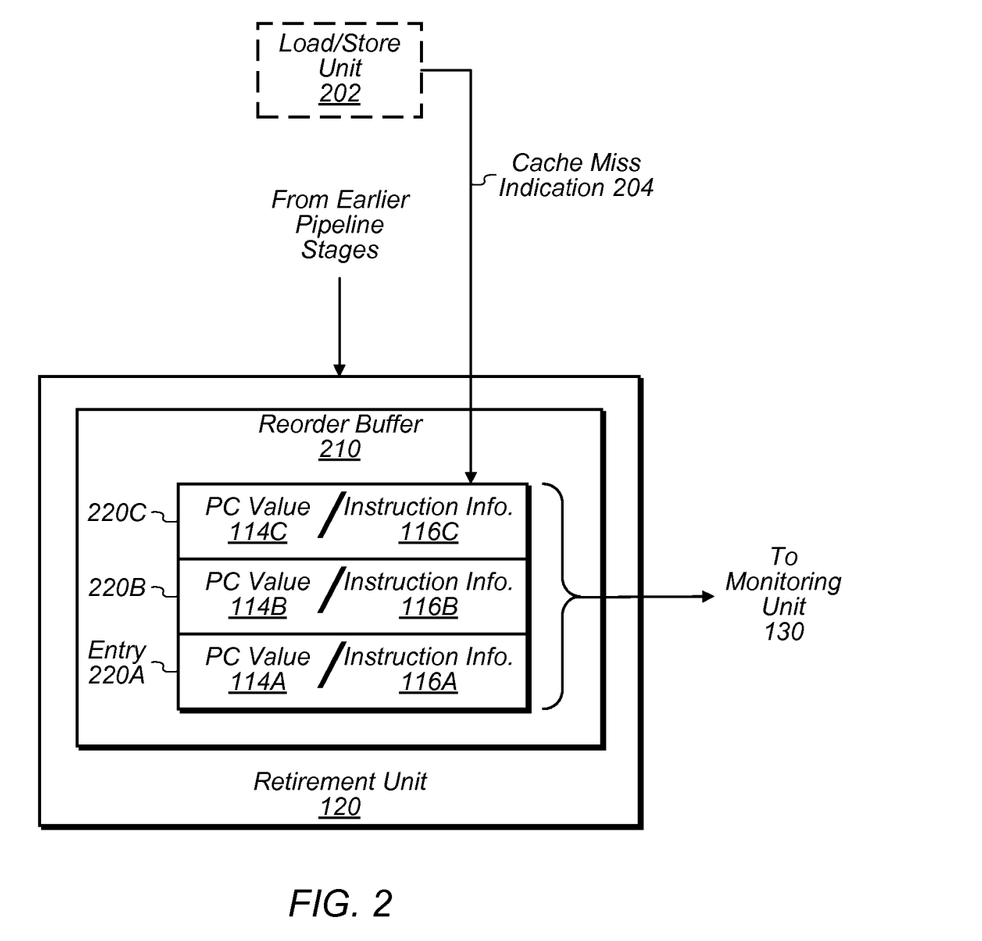
FIG. 2 is a block diagram illustrating one embodiment of a retirement unit in the processor that is configured to interface with the circuitry.

Turning now to FIG. 2, a block diagram of one embodiment of retirement unit 120 is depicted. As noted above, in various embodiments, retirement unit 120 may handle functions such as reordering instructions and updating architectural states. In some embodiments, retirement unit 120 may also collect information about executing instructions, which may be accessible to monitoring circuit 130. Accordingly, in the illustrated embodiment, retirement unit 120 includes a reorder buffer 210 configured to reorder instructions as they are received from earlier pipeline stages from execution pipelines 102. As shown, in some embodiments, reorder buffer 210 includes multiple entries 220A-C configured to store, for a given instruction, a respective PC value 114 and corresponding instruction information 116.

PC values 114, in one embodiment, are the values of PC 112 when instructions are fetched by instruction fetch unit 110. They may also be the addresses of the corresponding instructions in memory 104. In various embodiments, reorder buffer 210 receives PC values 114 from instruction fetch unit 110. In the illustrated embodiment, monitoring circuit 130 captures PC values 114 from reorder buffer 210. That is, rather than capture the values 114 directly from PC 112, monitoring circuit 130 captures them indirectly via reorder buffer 210. In other embodiments, however, monitoring circuit 130 may capture PC values 114 from other locations including from instruction fetch unit 110.

Instruction information 116, in one embodiment, includes execution results and various metadata associated with an instruction's execution. As noted above, this metadata may include information from earlier pipeline stages, which, in some embodiments, provide the information along with the instruction as it progresses through pipeline 102. For example, in illustrated embodiment, a load/store unit 202 is configured to provide a cache miss indication 204 for a load instruction or a store instruction that triggered a cache miss. In various embodiments, load/store unit 202 is circuitry configured to process load and store instructions, which may include accessing data stored in a data cache maintained by load/store unit 202. In some embodiments, instruction information 116 may also include indications identifying whether an instruction caused a translation lookaside buffer (TLB) miss, page fault, branch direction misprediction, branch target misprediction, etc. As noted above, monitoring circuit 130 may detect the occurrence of events by analyzing instruction information 116 retrieved from reorder buffer 210. For example, upon retrieving instruction information 116C, monitoring circuit 130 may determine that the instruction corresponding to 116C caused a page fault based on an indication in information 116C. In some embodiments, the particular contents of instruction information 116 may be configurable. For example, a user may request that the number of cache misses be tracked. In some embodiments, the particular contents of instruction information 116 may be selected by programming control registers 312 discussed below; however, in other embodiments, the particular contents may be selected differently.

Figure 3:
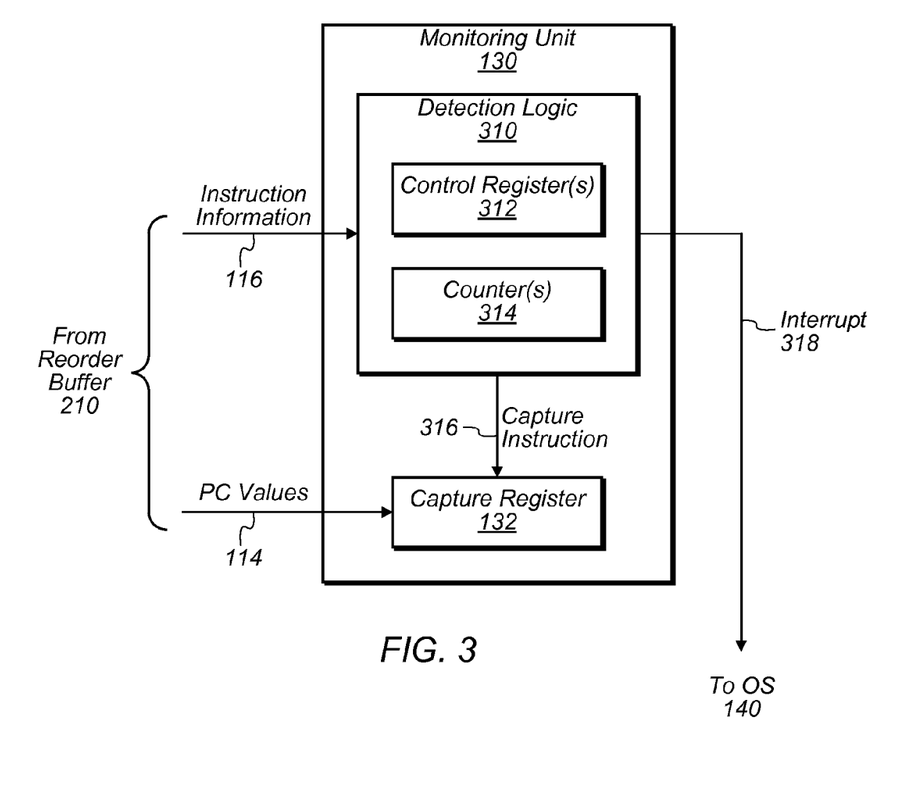
FIG. 3 is a block diagram illustrating one embodiment of monitoring circuitry configured to capture a program counter value.

Turning now to FIG. 3, a block diagram of monitoring circuit 130 is depicted. As noted above, in various embodiments, monitoring circuit 130 is configured to detect occurrences of events and capture corresponding PC values 114. Accordingly, in the illustrated embodiment, monitoring circuit 130 includes detection logic 310 and capture register 132. Detection logic 310 further includes one or more control registers 312 and one or more counters 314. In other embodiments, monitoring circuit 130 may be configured differently than shown.

Detection logic 310, in one embodiment, is circuitry configured to detect occurrences of events based on received instruction information 116 and to cause capturing of corresponding PC Values 114 into capture register 132. In the illustrated embodiment, detection logic 310 determines which events to monitor based on control registers 312 and counts the numbers of occurrences of events using counters 314. Once detection logic 310 determines that capturing a PC value 114 is warranted (e.g., based on a value of counter 314), detection logic 310 may instruct capture register 132 to store the PC value 114 by issuing a capture instruction 316 to register 132. Detection logic 310 may also raise an interrupt 318 to notify OS 140 that a PC value 114 has been captured.

Control registers 312, in one embodiment, are configured to store configuration information for monitoring circuit 130. In various embodiments, registers 312 are programmable to select which events are monitored by detection logic 310. In some embodiments, registers 312 are also programmable to specify thresholds for occurrences of events that cause capturing of PC values 114. For example, in one embodiment, debugger 150 may, based on user input, write values to registers 312 that cause monitoring circuit 130 to capture a PC value after a hundred cache misses have occurred. In one embodiment, upon receiving a request to monitor an event via a register 312, detection logic 310 may enable a corresponding counter 314 to begin counting occurrences of that event.

Counters 314, in one embodiment, are circuits that are each configured to count occurrences for a respective event being tracked by monitoring circuit 130. As noted above, detection logic 310 may use the values of counters 314 to determine whether to capture a PC value 114 and raise an interrupt 318. Accordingly, in one embodiment, detection logic 310 may compare the values of counters 314 against threshold values specified by control registers 312 and determine to perform a capture in response to a counter value satisfying a threshold value (e.g., matching or exceeding the threshold value). In another embodiment, a counter 314 may be set to some initial value that is decremented and that, upon reaching zero, causes capture. In still another embodiment, detection logic 310 may cause a capture in response to a counter overflow (i.e., a counter 314 reaching a value that is larger than it is capable of storing).

Counters 314 may track any of various suitable events. Accordingly, in some embodiments, counters 314 include counters that track retirement of particular instruction types—e.g., the number of retired conditional branch instructions, the number of retired indirect branch instructions, the number of retired call instructions, the number of retired return instructions, etc. In such an embodiment, counters 314 may also track the number of occurrences when a branch instruction was taken (or not taken). In some embodiments, counters 314 may include counters that track a number of branch mispredictions including direction (i.e., taken or not taken) mispredictions and/or target mispredictions for indirect branch instructions. In some embodiments, counters 314 may include counters that track the number of cache misses for load and store instructions. In some embodiments, counters 314 may include counters that track the number of replayed instructions (e.g., a load instruction that hits on an inflight store instruction executed out of order). In some embodiments, counters 314 may include counters that track the number of TLB misses and/or page faults. In some embodiments, counters 314 may include counters that track a combination of criteria noted above—e.g., a number of retired conditional branch instructions that were associated with a mispredicted direction.

As noted above, in various embodiments, capture register 132 is configured to capture PC values 114 and store values 114 until they can be retrieved, e.g., by OS 140 or debugger 150. In some embodiments, register 132 may also store additional information associated with the PC values 114. Accordingly, in one embodiment, a first portion of register 132 (e.g., the lower-order bits) may be used to store a PC value 114 while a second portion (e.g., one or more higher-order bits) may be used to store an indication of the event (e.g., that the PC value 114 pertains to a cache-miss event).

Figure 4A:
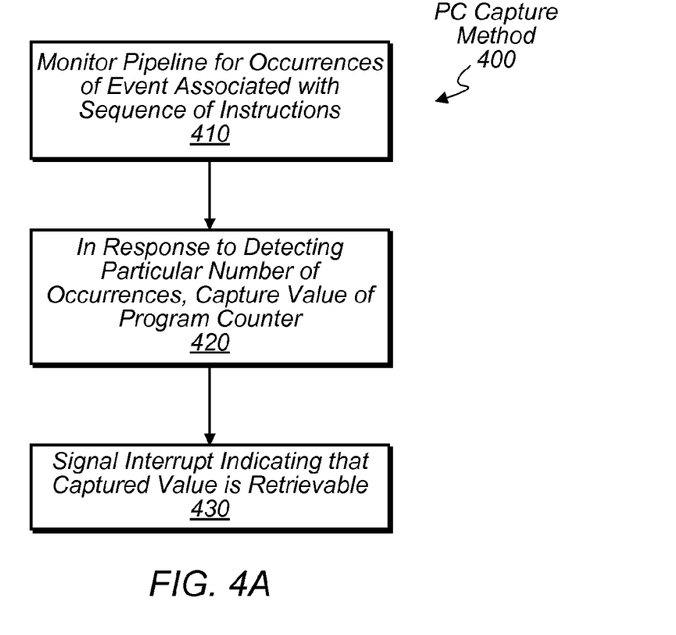
FIGS. 4A and 4B are flow diagrams illustrating embodiments of methods associated with capturing a program counter value.

Turning now to FIG. 4A, a flow diagram of a PC capture method 400 is depicted. Method 400 is one embodiment of a method that may be performed by circuitry configured to capture a value of a program counter such as monitoring circuitry 130. In some instances, performance of method 400 may allow a more precise program counter value to be captured for a detected event.

In step 410, an execution pipeline (e.g., pipeline 102) is monitored for occurrences of an event associated with a sequence of instructions executing in the execution pipeline. In some embodiments, step 410 includes receiving a request specifying one or more of a plurality of distinct events for monitoring (e.g., cache misses and branch mispredictions), and in response to the request, monitoring occurrences of the one or more events by enabling one or more counters (e.g., counters 314) included in the monitoring circuitry. In such an embodiment, the one or more counters are each configured to track occurrences of a respective one of the one or more events. In some embodiments, step 410 includes receiving a request specifying the particular number of occurrences of the event to cause capturing of a program counter value. In one embodiment, the event is a cache miss, and the monitoring circuitry is configured to capture a program counter value in response to detecting a particular number of cache misses occurring during execution of the sequence of instructions. In some embodiments, a reorder buffer (e.g., reorder buffer 210) reorders instructions that are executed out of order and stores statistics (e.g., instruction information 116) for instructions executed in the execution pipeline. In such an embodiment, step 410 may include monitoring occurrences of the event by retrieving the stored statistics from reorder buffer.

In step 420, a value of a program counter (e.g., PC value 114 of PC 112) is captured in response to detecting a particular number of occurrences of the event. In various embodiments, step 420 includes storing the captured value of the program counter in a distinct capture register (e.g., capture register 132). In some embodiments, the stored statistics include a program counter values associated with the instructions and indications of whether the instructions are associated with occurrences of the event. In such an embodiment, the monitoring circuitry is configured to capture the value of the program counter from the reorder buffer. In one embodiment, the value of the program counter is stored in a first portion of the register and an indication of the event in a second portion of the register.

In step 430, an interrupt indicating that the captured value of the program counter is retrievable from the capture register is signaled. In some embodiments, this interrupt may cause an operating system to initiate execution of a program, such as a debugger, that is executable to retrieve the value and present it to a user.

Figure 4B:
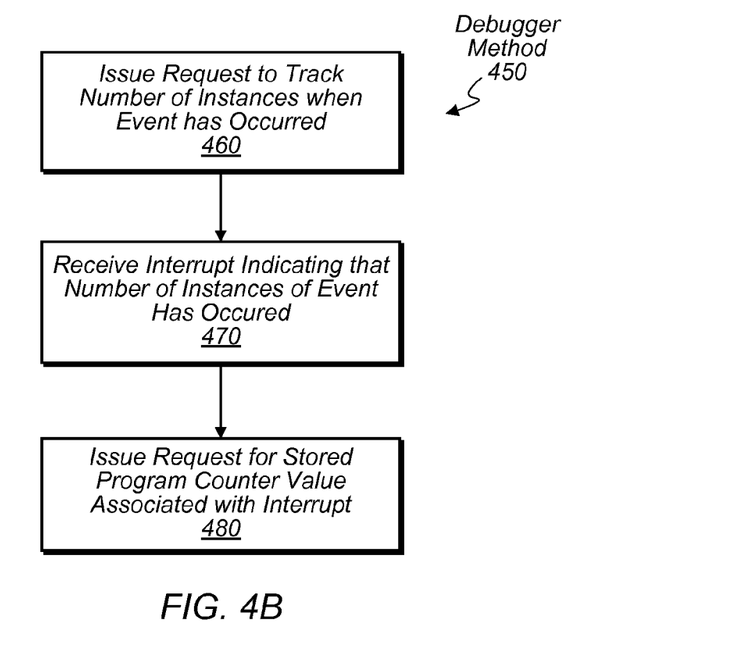

Turning now to FIG. 4B, a flow diagram of a debugger method 450 is depicted. In some embodiments, method 450 may be performed by a debugging application used for code profiling such as debugger 150. In some instances, performance of method 450 may allow a developer to better optimize and debug software being developed for a computing device. Although described within the context of debugging, method 450 may also be performed by other applications and/or hardware that would be benefit from knowing a program counter value for an event associated with instruction execution.

In step 460, a request is issued to circuitry in a processor (e.g., monitoring circuit 130) to track a number of instances that an event has occurred during execution of a set of instructions. In some embodiments, the circuitry is configured to track a plurality of distinct events, and the request identifies the event or events to be tracked.

In step 470, an interrupted indicating that a number of instances of the event has occurred is signaled. In various embodiments, the circuitry signals the interrupt in response to the number of occurring instances satisfying a threshold value. The circuitry may also store a program counter value associated with the interrupt and an instruction that caused an occurrence of the event. In some embodiments, method 450 may include indicating the threshold value to the circuitry by writing the threshold value to a register (e.g., a control register 312) in the circuitry that controls operation of the circuitry.

In step 480, a request for the stored program counter value is issued to the circuitry. In some embodiments, the requests issued in steps 460 and 480 are issued by making application programming interface (API) calls (e.g., calls 144) to an operating system of a computing device that includes the processor.

Exemplary Computer System

Figure 5:
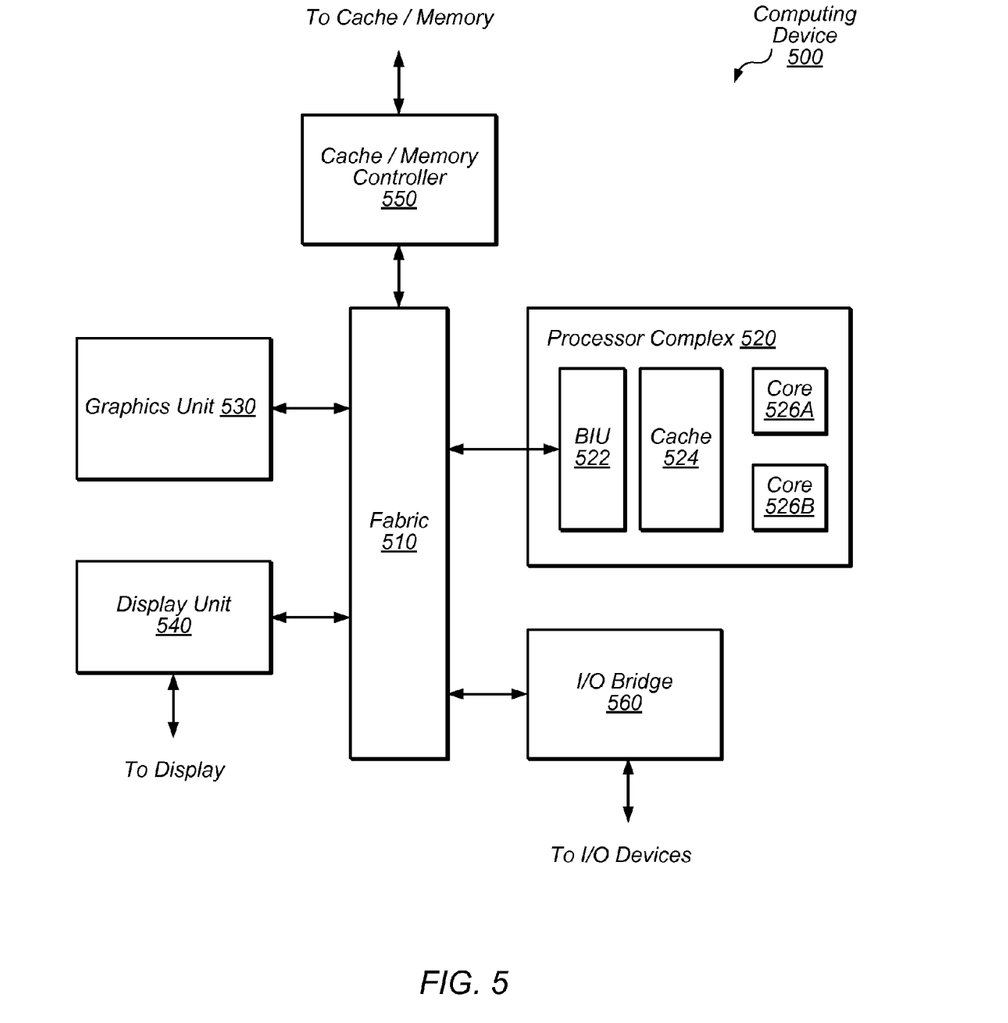
FIG. 5 is a block diagram illustrating one embodiment of an exemplary computer system.

Turning now to FIG. 5, a block diagram illustrating an exemplary embodiment of a device 500 is shown. In some embodiments, elements of device 500 may be included within a system on a chip (SOC). In some embodiments, device 500 may be included in a mobile device, which may be battery-powered. Therefore, power consumption by device 500 may be an important design consideration. In the illustrated embodiment, device 500 includes fabric 510, processor complex 520, graphics unit 530, display unit 540, cache/memory controller 550, input/output (I/O) bridge 560. In some embodiments, device 500 may correspond to computing device 10 shown in FIG. 1, with processor complex 520 corresponding to processor 100.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA) which may include operating system instructions and user application instructions. In some embodiments, processor complex 520 may correspond to processor 100 described above.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   issuing, by a debugger application to circuitry in a processor, a first request to track a number of instances that an event has occurred during execution of a set of instructions, wherein the event is a branch misprediction;
   receiving, by the debugger application, an interrupt from the circuitry, wherein the circuitry is configured to automatically capture a program counter value from a program counter of the processor in response to the number of instances satisfying a threshold value, wherein the circuitry is configured to monitor occurrences of the event by retrieving statistics from a reorder buffer that reorders instructions executed out of order in an execution pipeline of the processor, wherein the circuitry is configured to signal the interrupt in response to capturing the program counter value, and wherein the program counter value is associated with an instruction that caused an occurrence of a branch misprediction; and
   issuing, by the debugger application to the circuitry, a second request for the captured program counter value.

2. The method of claim 1, wherein the debugger application issues the first and second requests by making application programming interface (API) calls to an operating system of a computing device that includes the processor.

3. The method of claim 1, wherein the circuitry is configured to track a plurality of distinct events including the event, and wherein the first request identifies the event to be tracked.

4. The method of claim 1, further comprising:
   indicating the threshold value to the circuitry by writing the threshold value to a register in the circuitry that controls operation of the circuitry.

5. An integrated circuit, comprising:
   an execution pipeline configured to execute a sequence of instructions; and
   monitoring circuitry configured to:
     monitor the execution pipeline for occurrences of an event associated with the sequence of instructions;
     in response to detecting a particular number of occurrences of the event, automatically capture a value of a program counter corresponding to an instruction of the sequence of instructions that is associated with an occurrence of the event;
     store the captured value of the program counter in a distinct capture register; and
     signal an interrupt indicating that the captured value of the program counter is retrievable from the capture register, wherein the interrupt causes a debugger program to retrieve the captured value of the program counter;
   wherein the event is a branch misprediction, and wherein the monitoring circuitry is configured to capture the value of the program counter in response to detecting a particular number of branch mispredictions occurring during execution of the sequence of instructions; and
   wherein the execution pipeline includes a reorder buffer configured to:
     reorder instructions that are executed out of order; and
     store statistics for instructions executed in the execution pipeline, wherein the monitoring circuitry is configured to monitor occurrences of the event by retrieving the stored statistics from the reorder buffer.

6. The integrated circuit of claim 5, wherein the monitoring circuitry is configured to:
   receive a request specifying one or more of a plurality of distinct events for monitoring; and
   in response to the request, monitor occurrences of the one or more specified events by enabling one or more counters included in the monitoring circuitry, wherein the one or more counters are each configured to track occurrences of a respective one of the one or more events.

7. The integrated circuit of claim 5, wherein the monitoring circuitry is configured to:
   receive a request specifying the particular number of occurrences of the event to cause capturing the value of the program counter.

8. The integrated circuit of claim 5, wherein the monitoring circuitry is configured to:
   monitor the execution pipeline for occurrences of a plurality of events including a cache miss, and wherein the monitoring circuitry is configured to capture the value of the program counter in response to detecting a particular number of cache misses occurring during execution of the sequence of instructions.

9. The integrated circuit of claim 5, wherein the stored statistics include program counter values associated with the instructions and indications of whether the instructions are associated with occurrences of the event, and wherein the monitoring circuitry is configured to capture the value of the program counter from the reorder buffer.

10. The integrated circuit of claim 5, wherein the monitoring circuitry is configured to store the value of the program counter in a first portion of the register and an indication of the event in a second portion of the register.

11. A computing device, comprising:
    a processor configured to maintain a program counter usable to identify instructions for execution in an execution pipeline; and
    monitoring circuitry configured to:
      monitor execution of a sequence of the instructions for an event, wherein the event is a branch misprediction;
      in response to identifying an occurrence of the event, automatically capture, from the program counter, a program counter value associated with the occurrence of the event, wherein the captured program counter value corresponds to an address of a branch instruction;

store the program counter value into a register;

issue, responsive storing the program counter value, an interrupt that notifies a debugger application of the stored program counter value; and service a request, from the debugger application, to retrieve the program counter value from the register; and wherein the execution pipeline includes a reorder buffer configured to:

reorder instructions that are executed out of order; and store statistics for instructions executed in the execution pipeline, wherein the monitoring circuitry is configured to monitor occurrences of the event by retrieving the stored statistics from the reorder buffer.

12. The computing device of claim 11, wherein the monitoring circuitry is configured to:

count a number of occurrences of the event during execution of the instructions;

determine whether the number satisfies a threshold value; and in response to determining that the number satisfies the threshold value, store the program counter value into the register, wherein the stored program counter value is associated with an instruction that causes the identified occurrence of the event.

13. The computing device of claim 11, wherein the monitoring circuitry is configured to:

monitor the execution pipeline for occurrences of a plurality of events including a retirement of a particular type of instruction, and wherein the monitoring circuitry is configured to store the program counter value into the register in response to identifying that a retirement of the particular type of instruction has occurred, wherein the stored program counter value corresponds to the instruction identified as retired.

14. The computing device of claim 11, wherein the event is a branch direction misprediction, wherein the monitoring circuitry is configured to store the program counter value into the register in response to identifying that a branch direction misprediction has occurred, and wherein the stored value corresponds to an address of a branch instruction having a mispredicted direction.

15. The computing device of claim 11, wherein the event is a branch target misprediction, wherein the monitoring circuitry is configured to store the program counter value into the register in response to identifying that a branch direction misprediction has occurred, and wherein the stored value corresponds to an address of a branch instruction having a mispredicted target address.

16. The computing device of claim 11, wherein the processor is configured to send the program counter value with an instruction as the instruction passes through the execution pipeline of the processor, and wherein the monitoring circuitry is configured to retrieve the program counter value from a retirement unit in the execution pipeline and to store the program counter value in the register.

\* \* \* \* \*